US010959399B2

(12) United States Patent
Hampton et al.

(10) Patent No.: US 10,959,399 B2
(45) Date of Patent: Mar. 30, 2021

(54) DISPOSABLE AND MUTICONFIGURABLE HABITAT FOR OBTAINING PHYSIOLOGICAL MEASUREMENTS OF SMALL MAMMALS

(71) Applicant: Mouse Specifics, Inc., Framingham, MA (US)

(72) Inventors: Thomas G. Hampton, Framingham, MA (US); Melissa B. Lewis, Boston, MA (US)

(73) Assignee: Mouse Specifics, Inc., Framingham, MA (US)

( * ) Notice: Subject to any disclaimer, the term of this patent is extended or adjusted under 35 U.S.C. 154(b) by 0 days.

(21) Appl. No.: 16/872,854

(22) Filed: May 12, 2020

(65) Prior Publication Data
US 2021/0015075 A1 Jan. 21, 2021

Related U.S. Application Data

(60) Provisional application No. 62/935,412, filed on Nov. 14, 2019, provisional application No. 62/875,119, filed on Jul. 17, 2019.

(51) Int. Cl.
*A01K 1/03* (2006.01)
*A01K 29/00* (2006.01)

(52) U.S. Cl.
CPC ............ *A01K 1/031* (2013.01); *A01K 29/005* (2013.01)

(58) Field of Classification Search
CPC . A01K 1/031; A01K 1/00; A01K 1/02; A01K 1/03; A01K 1/032; A01K 1/033; A01K 1/034; A01K 1/0125; A63H 3/52
See application file for complete search history.

(56) References Cited

U.S. PATENT DOCUMENTS 5,050,536 A * 9/1991 Baker ................... A01K 1/035
119/499
5,320,065 A * 6/1994 Leopold ................ A01K 1/035
119/498

(Continued)

OTHER PUBLICATIONS

International Search Report from PCT/US1010/032457, dated Jul. 28, 2020.

*Primary Examiner* — Kristen C Hayes
(74) *Attorney, Agent, or Firm* — Morse, Barnes-Brown & Pendleton, P.C.; Sean D. Detweiler, Esq.

(57) ABSTRACT

A disposable and multiconfigurational animal habitat for obtaining physiological measurements of a small mammal is provided. The habitat includes a disposable and vertically oriented tower having a top, middle, and a bottom section. The tower includes a first chamber and a second chamber. The first chamber is sized, shaped, and configured to house the small mammal and is disposed in the top section of the tower. A first instrumentation platform is disposed in the first chamber and configured to support the small mammal. The second chamber is also sized, shaped, and configured to house the small mammal and disposed underneath the first instrumentation platform. A second instrumentation platform disposed in the second chamber and configured to support the small mammal. The habitat can be assembled from a kit comprising sheet of foldable disposable material having cut-outs and fold lines that can be folded to form the tower of the habitat.

50 Claims, 7 Drawing Sheets

(56) References Cited

U.S. PATENT DOCUMENTS

| | | | |
|---|---|---|---|
| 6,082,386 A * | 7/2000 | Zheng | A63B 9/00 135/119 |
| 6,099,411 A * | 8/2000 | Van Wagenen | A63B 9/00 472/136 |
| 7,269,516 B2 | 9/2007 | Brunner et al. | |
| 7,337,748 B1 * | 3/2008 | Morris | A01K 15/025 119/482 |
| 7,487,744 B1 * | 2/2009 | Goldberg | A01K 1/031 119/453 |
| 8,468,975 B2 * | 6/2013 | Salzmann | G01N 27/028 119/421 |
| 8,640,652 B2 * | 2/2014 | Callari | A01K 1/035 119/702 |
| 8,694,086 B2 | 4/2014 | Hampton | |
| 8,763,559 B2 * | 7/2014 | Salzmann | A01K 29/005 119/421 |
| 8,794,186 B2 * | 8/2014 | Donta | A01K 1/0125 119/168 |
| 9,326,483 B2 * | 5/2016 | Hall | A01K 1/033 |
| 10,238,085 B2 * | 3/2019 | Woolf | A61B 5/1038 |
| 10,314,284 B2 | 6/2019 | Termini et al. | |
| 10,492,463 B2 * | 12/2019 | Deraps | A01K 15/027 |
| 10,750,717 B2 * | 8/2020 | Hickman-Miller | A01K 15/02 |
| 2007/0236356 A1 * | 10/2007 | Zhang | A61B 5/1105 340/573.2 |
| 2008/0196672 A1 | 8/2008 | Mokhtarian et al. | |
| 2012/0015582 A1 * | 1/2012 | van Tilburg | A63H 3/52 446/110 |
| 2013/0036986 A1 * | 2/2013 | Callari | A01K 1/035 119/702 |
| 2015/0373944 A1 * | 12/2015 | Hall | A01K 1/033 119/498 |
| 2017/0339916 A1 * | 11/2017 | Deraps | A01K 1/033 |
| 2018/0146644 A1 | 5/2018 | Betts-Lacroix et al. | |
| 2020/0146256 A1 * | 5/2020 | Chen | A01K 1/033 |

* cited by examiner

DISPOSABLE AND MUTICONFIGURABLE HABITAT FOR OBTAINING PHYSIOLOGICAL MEASUREMENTS OF SMALL MAMMALS

CROSS-REFERENCE TO RELATED APPLICATION(S)

This application claims priority to, and the benefit of, U.S. Provisional Application No. 62/875,119, filed Jul. 17, 2019 and U.S. Provisional Application No. 62/935,412, filed Nov. 14, 2019, for all subject matter contained in said applications. The disclosures of said provisional applications are hereby incorporated by reference in their entirety.

FIELD OF THE INVENTION

The present invention relates to measurements of physiological characteristics in mammals. More particularly, the present invention relates to a disposable and multiconfigurational habitat for non-invasively obtaining physiological measurements of a small mammal.

BACKGROUND

Small animals, or more specifically, small mammals such as mice and hamsters, are routinely used in the research setting for studying a wide range of human disorders. Moreover, there are about 1 million people in the US that keep mice and hamsters as pets. There is a need to monitor the health and well-being of such small mammals for research purposes or to ensure their good health. For humans, the health of the heart is routinely checked, either by recording a blood pressure, checking the pulse, or recording an electrocardiogram. In small mammals, however, this is not routine, as small animals such as mice can move very fast, try to escape measurement, and attempt to bite whomever is handling the animal. Therefore, small mammals are often anesthetized or sedated in order to gauge heart health. However, it is well known that the anesthetic or sedation can profoundly affect the true metrics of heart health. Monitoring of the heart rate and electrocardiogram in some animals is often performed by inserting pin electrodes into the sedated subject's appendages, affixing the animal's forelimbs and hind limbs to conductive electrodes, or surgically inserting implants. The imposition of the pin electrodes can cause pain and tissue damage, the affixing of limbs to conductive electrodes is often cumbersome, and the surgical implants can require weeks of recovery. Therefore, a need exists for improved methodologies to record the ECG from awake small mammals.

U.S. Pat. No. 6,445,941 previously described an invention whereby the small animal stands on an array of conductive electrodes. U.S. Pat. No. 8,649,086 described an invention having two points of electrical contact crossing the subject's heart. The data capture is greatly improved when the subject's range of motion is limited. Therefore, typically, a small animal such as a mouse is placed on an elevated platform a height sufficient to discourage the subject from alighting from the platform. The height has heretofore been accomplished via maintaining a structure dedicated to supporting the instrumented platform. To the elevated platform is added an ECG sensor, so that the animal is standing upon the sensor at height sufficient to discourage the animal from alighting from said instrumented elevated platform. Small laboratory animals will urinate and defecate indiscriminately, soiling their cages, temporary or permanent. If not managed, a small animal itself will soil itself, and as such the possibility of establishing or detecting a clear stable electrical signal between a signal detector and appendage [e.g., foot or tail] of the animal can become unreliable.

There is a demand for physiological readouts in lab animals to provide indices of disease, health, medicine toxicity, and therapeutic efficacy. There is a need of physiological readouts to indicate whether an animal is healthy, or unhealthy, feeling content, or distressed, in pain, or not in pain. Often pain is associated with nervous system changes that are often reflected by increases in heart rate, decreases in heart rate variability, or both. Often, pain is associated with changes in the olfactory system. Other diseases and disorders associated with changes in the nervous system and olfactory system include Parkinson's disease, pain, Down syndrome, Alzheimer's disease, and aging. Stress itself is associated with changes in heart rate and heart rate variability. It is also known that aromatherapy can help mitigate stress.

SUMMARY

Therefore, a need exists for improved methodologies to record the ECG or heart rate from awake small mammals. In addition, it would be advantageous to have the ability to test whether sensual cues such as odors can elicit changes in the ECG, and whether the absence or presence of changes, or the degree of changes, are indicators of the health status of the subject.

In accordance with embodiments set forth herein facilitates the obtaining of ECG data from awake mammals and further allows testing of novel aromatic agents for their effects of reducing heart rate and/or increasing heart rate variability, reflecting reductions in stress.

Embodiments of the present invention incorporate the structure, height, and recording platform into one component, such as a sheet of cardboard or plastic of sufficient width and height, by way of a pattern of cut openings and partially cut score lines, that when properly manipulated according to a set of pre-defined instructions, presents the ECG recording sensor integral with the platform at sufficient height for placement of the animal for ECG recording. The floor, moreover, is configured with openings to allow urine and feces to fall below the floor surface. A grille pattern allows opposite rails of the grille to be electrically polar opposites, to increase the likelihood that contact between the paws and the floor will affect the detection of the ECG signal.

In accordance with one embodiment of the present invention, a disposable and multiconfigurational animal habitat for obtaining physiological measurements of a small mammal is provided. The habitat includes a disposable and vertically oriented tower having a top section, a middle section, and a bottom section. The tower includes a first chamber and a second chamber. The first chamber is sized, shaped, and configured to house the small mammal and is disposed in the top section of the tower. A first instrumentation platform is disposed in the first chamber and configured to support the small mammal. The second chamber is also sized, shaped, and configured to house the small mammal and disposed underneath the first instrumentation platform. A second instrumentation platform disposed in the second chamber and configured to support the small mammal.

In accordance with an aspect of the present invention, the habitat is formed of a sheet of foldable disposable material.

In certain such aspects, the habitat is formed of corrugated fiberboard. In other such aspects, the habitat is formed of plastic.

In accordance with an aspect of the present invention, the physiological measurements are obtained non-invasively.

In accordance with an aspect of the present invention, the habitat further includes a plurality of through holes through the first instrumentation platform. In other aspects, the habitat includes a plurality of slotted apertures forming a grill shape in the first instrumentation platform.

In accordance with an aspect of the present invention, the habitat further includes a pass-through opening in the first instrumentation platform that is sized and shaped to enable the small mammal to pass through between the first chamber and the second chamber. In some such aspects, a ladder disposed on the second instrumentation platform and through the pass-through opening.

In accordance with an aspect of the present invention, the habitat further includes one or more conduit holes passing through walls of the tower.

In accordance with an aspect of the present invention, the tower has a parallelogram cross-sectional shape. In some such aspects, the first chamber comprises three walls. In still other aspects, the second chamber also comprises two opposing walls. In still further aspect the bottom section includes three walls. In other aspects, the first chamber or second chamber comprises at least two support structures defining at least a portion of chamber walls. In certain aspects, the second chamber includes an angled slot in each of the two opposing walls that are sized, shaped, and configured to receive a mirror in such a way that when the mirror is placed through the angled slots the mirror is mounted at an angle enabling a view to an underside of the first instrumentation platform by an observer located in front of the tower. In some such aspect, the observer is enabled to view an underside of the small mammal through openings in the first instrumentation platform when the small mammal is disposed on the first instrumentation platform. In certain aspects, the habitat includes at least one window aperture in at least one wall of the first chamber and/or second chamber.

In accordance with an aspect of the present invention, the habitat further includes a flexible transparent film disposed around a perimeter inside the first chamber.

In accordance with an aspect of the present invention, the habitat further includes electrically conductive material disposed on a top surface of the first instrumentation platform. In some such aspects, the electrically conductive material is configured to obtain electrocardiographic signal measurements when the small mammal is disposed thereon.

In accordance with an aspect of the present invention, the first instrumentation platform is disposed at a height sufficient to discourage the small mammal from alighting from the platform. In some such embodiments, the height sufficient to discourage the small mammal from alighting from the platform is at least about 8 inches. In still further aspects, the height sufficient to discourage the small mammal from alighting from the platform is between about 8 inches and about 12 inches.

In accordance with an aspect of the present invention, the habitat further includes a supply tube sized, shaped, and configured to supply odors, gases, and/or vapors to the first chamber. In some such aspects, the supply tube is configured to extend from the bottom section of the tower, through the second chamber disposed in the middle section to the first chamber disposed in the top section of the tower.

In accordance with an aspect of the present invention, the habitat includes a reinforcing support structure disposed in the bottom section of the tower.

In accordance with an aspect of the present invention, the habitat includes a third instrument platform disposed in the bottom section of the tower.

In accordance with an embodiment of the present invention, a kit for a disposable and multiconfigurational animal habitat for obtaining physiological measurements of a small mammal is provided. The kit consists of a sheet of disposable and foldable material. The sheet has at least two fold lines extending along a first dimension (the length) of the sheet defining at least three panels (left, back, right), with each panel having a top, middle, and bottom section; a first instrumentation platform disposed in a top section of one of the panels, the first instrumentation platform having three sides separated from the panel and a fourth side attached to the panel along a fold line along a second dimension (the width) of the panel; and a second instrumentation platform disposed in a middle section of one of the panels, the second instrumentation platform having three sides separated from the panel and a fourth side attached to panel along a fold line along a second dimension (the width) of the panel.

The sheet is folded along the two fold lines along the first dimension of the sheet to form a tower with the at least three panels forming the walls of the tower, the tower having a top section, middle section, and bottom section. the first instrumentation platform is folded into the tower along the fold line along the second direction to form, in conjunction with the walls of the tower, a first chamber sized, shaped, and configured to house a mammal and disposed in the top section of the tower. The second instrument platform is folded into the tower along the fold line along the second direction to form, in conjunction with the walls of the tower, a second chamber sized, shaped, and configured to house a mammal and disposed in the middle section of the tower.

In accordance with an aspect of the present invention, the kit further includes one or more first instrument platform support tabs disposed in the upper section of one or more panels other than the panel having the first instrumentation platform, the one or more first instrument platform tabs having three sides separated from the panel and a fourth side attached to panel along a fold line along a second dimension (the width) of the panel wherein the first instrument platform support tabs are folded into the tower to provide support for the first instrument platform.

In accordance with an aspect of the present invention, the kit further includes one or more second instrument platform support tabs disposed in the middle section of one or more panels other than the panel having the second instrumentation platform, the one or more second instrument platform support tabs having three sides separated from the panel and a fourth side attached to panel along a fold line along a second dimension (the width) of the panel wherein the second instrument platform support tabs are folded into the tower to provide support for the second instrument platform.

In accordance with an aspect of the present invention, the kit further includes at least two tower reinforcing structure tabs disposed in a bottom section of at least two panels, the at least two tower reinforcing structure tabs having three sides separated from the panel and a fourth side attached to panel along a fold line along a second width dimension of the panel wherein the tower reinforcing structure tabs are folded into the tower and secured together to provide reinforcing structure for the tower.

In accordance with an aspect of the present invention, the sheet of disposable and foldable material comprises a third fold line along the first dimension of the sheet, a length, defining a fourth panel wherein when folded along the third fold line, the fourth panel forms a fourth wall of the tower. In some such aspects, the fourth panel further comprises cut-outs in an upper and/or middle section to provide access the first chamber and/or second chamber when the sheet is folded to form the tower.

In accordance with an aspect of the present invention, the sheet of disposable and foldable material is sheet of corrugated fiberboard. In other aspects, the sheet is a sheet of plastic.

In accordance with an aspect of the present invention, the first instrumentation platform of the kit further comprises a plurality of holes therethrough. In other aspects, the first instrumentation platform further comprises a plurality of slotted apertures forming a grill shape.

In accordance with an aspect of the present invention, the kit further includes a pass-through opening in the first instrumentation platform that is sized and shaped to enable the small mammal to pass through between the first chamber and the second chamber. In some such aspects, the kit may further include a ladder disposed on the second instrumentation platform and through the pass-through opening.

In accordance with an aspect of the present invention, the formed tower has a parallelogram cross-sectional shape.

In accordance with an aspect of the present invention, the kit further includes an angled slot in each of two panels forming two opposing walls of the tower, the angled slots sized, shaped, and configured to receive a mirror in such a way that when the mirror is placed through the angled slots the mirror is mounted at an angle enabling a view to an underside of the first instrumentation platform by an observer located in front of the tower.

In accordance with an aspect of the present invention, the kit further includes at least one window aperture in an upper section of a panel that forms least one wall of the first chamber. In other aspects, the kit further includes at least one window aperture in a middle section of a panel that forms at least one wall of the second chamber.

In accordance with an aspect of the present invention, the kit further includes a flexible transparent film disposed on the surface of the sheet along a top section of the at least three panels.

In accordance with an aspect of the present invention, the kit further includes electrically conductive material disposed on a top surface of the first instrumentation platform. In some such aspects, the electrically conductive material is configured to obtain electrocardiographic signal measurements when the small mammal is disposed thereon.

In accordance with an aspect of the present invention, the first instrumentation platform is disposed in the panel such that the height of the folded first instrument platform in the formed tower is sufficient to discourage the small mammal from alighting from the platform. In some such aspects, the height sufficient to discourage the small mammal from alighting from the platform is at least about 8 inches. In still further aspects, the height sufficient to discourage the small mammal from alighting from the platform is between about 8 inches and about 12 inches.

In accordance with an aspect of the present invention, the kit further includes a supply tube sized, shaped, and configured to supply odors, gases, and/or vapors to the first chamber of a formed tower. In some such aspects, the supply tube is configured to extend from the bottom section of the tower, through the second chamber disposed in the middle section to the first chamber disposed in the top section of the tower.

In accordance with an aspect of the present invention, the kit further includes a third instrumentation platform disposed in a bottom section of one of the panels, the third instrumentation platform having three sides separated from the panel and a fourth side attached to panel along a fold line along a second dimension (the width) of the panel In one embodiment, the ECG recording platform is easily removed and replaced by a similarly sized and shaped platform of transparent material, to provide a more unobstructed view of the ventral view of the subject upon said platform.

In one embodiment, the ECG recording platform is elevated at a height sufficient to discourage the subject from alighting from the surface on to the table surface upon which the erected adobe has been set. This height is about 10", +/−2".

In one embodiment of the invention, the erected height of the apparatus is small enough to fit inside a standard laboratory mouse shoebox cage. In one embodiment, the erected height does not exceed 6 inches and is greater than −1 inch [+/−1.0"], such enabling the subject to freely ascend the platform, rest upon the platform, and alight from the platform at will. The grilled design yet allows excrement to pass below to the cage bedding.

The present invention set forth and described herein allows for non-invasively detecting the electrocardiogram [ECG] via the feet of a small animal, such as a mouse or hamster, as it explores a temporary housing configured to secure the animal sufficiently to detect physiological signals, before replacing the subject to its permanent abode, and disposing of the temporary housing. The novel design of the ECG sensor is that it is embedded in a collapsible sheet of material that can be readily assembled for the purpose of recording the ECG and disposed of when the measurement is complete, and the animal returned to more permanent housing. Different from a disposable sensor per se, this invention is a disposable habitat for the subject, with the sensor integral to the floor surface(s) of said temporary habitat. In addition, the present invention allows for introducing odors, vapors, and gases to the subject in the ECG recording habitat, to test whether introduction of such causes changes in the ECG, and whether such changes reflect the health status of the subject.

It is known that certain diseases and disorders such as Parkinson's disease, Alzheimer's disease, and pain are associated with changes in the olfactory system. It is also known that certain odors and inhalants can cause changes in the ECG. The present invention allows for discerning a differential change in the ECG in response to inhalants that affect the autonomic nervous system modulation of the heart rate in normal mice in comparison to mice with certain diseases, and using the differences to indicate the presence, absence, or correction of disease.

The present invention set forth and described herein provides a smaller collapsible abode sensitized with the ECG electrode grille array that fits inside a standard small laboratory animal cage, such as a typical 6-inch×9"×4" "shoebox" cage. The habitat may also include artifices for insertion of a tube to carry odor, gases, and vapors from a source of the same to proximity to the subject upon the ECG recording means. The design may also include slots configured for placement of a mirror immediately below the ECG sensing platform and angled 45 degrees for facile observation via the ventral view of changes in posture simultaneous with changes in the ECG.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a disposable and multiconfigurational animal habitat for obtaining physiological measurements of a small mammal is provided. The habitat includes a disposable and vertically oriented tower having a top section, a middle section, and a bottom section. The tower includes a first chamber and a second chamber. The first chamber is sized, shaped, and configured to house the small mammal and is disposed in the top section of the tower. A first instrumentation platform is disposed in the first chamber and configured to support the small mammal. The second chamber is also sized, shaped, and configured to house the small mammal and disposed underneath the first instrumentation platform. A second instrumentation platform disposed in the second chamber and configured to support the small mammal.

The disposable and multiconfigurational animal habitat can be provided in an unassembled kit form. The kit consists of a sheet of disposable and foldable material. The sheet has at least two fold lines extending along a first dimension (the length) of the sheet defining at least three panels (left, back, right), with each panel having a top, middle, and bottom section; a first instrumentation platform disposed in a top section of one of the panels, the first instrumentation platform having three sides separated from the panel and a fourth side attached to the panel along a fold line along a second dimension (the width) of the panel; and a second instrumentation platform disposed in a middle section of one of the panels, the second instrumentation platform having three sides separated from the panel and a fourth side attached to panel along a fold line along a second dimension (the width) of the panel. The sheet can be folded along the two fold lines along the first dimension of the sheet to form a tower with the at least three panels forming the walls of the tower with the tower having a top section, middle section, and bottom section. The first instrumentation platform is folded into the tower along the fold line along the second direction to form, in conjunction with the walls of the tower, a first chamber sized, shaped, and configured to house a mammal and disposed in the top section of the tower. The second instrument platform is folded into the tower along the fold line along the second direction to form, in conjunction with the walls of the tower, a second chamber sized, shaped, and configured to house a mammal and disposed in the middle section of the tower.

FIG. 1 through FIG. 7 wherein like parts are designated by like reference numerals throughout, illustrate an example embodiment or embodiments of disposable and multiconfigurational animal habitat for obtaining physiological measurements of a small mammal, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1:
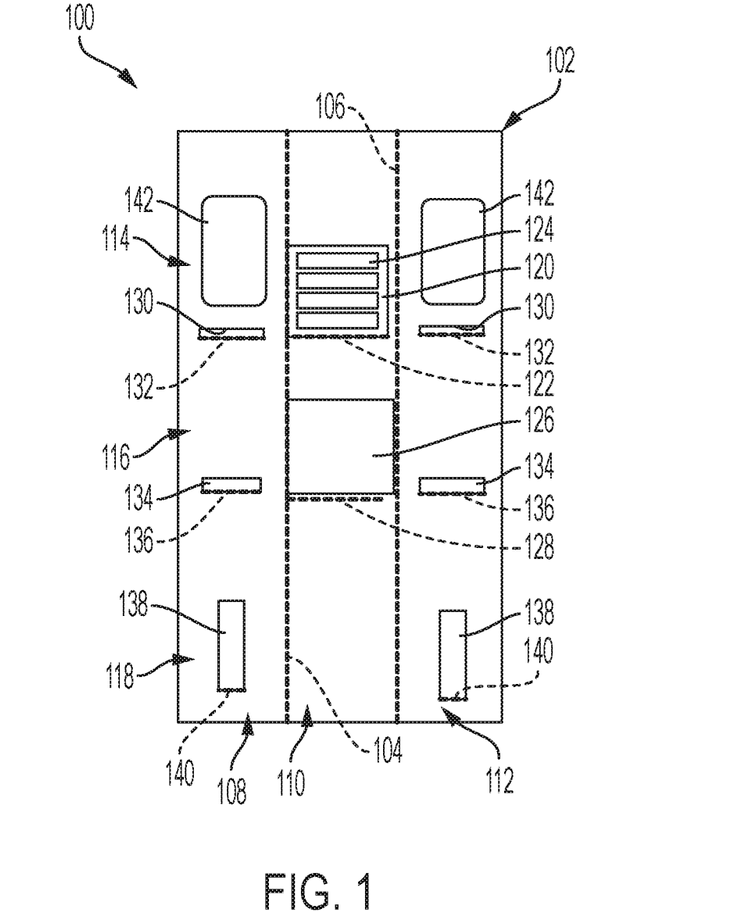
FIG. 1 depicts a kit for the disposable and multiconfigurational habitat in an un-folded and unassembled state in accordance with one embodiment of the present invention.

FIG. 1 depicts an example of kit 100 for a disposable and multiconfigurational animal habitat for obtaining physiological measurements of a small mammal in including example dimensions for the various elements. The kit 100 comprises a sheet 102 of disposable and foldable material that can be folded or otherwise assembled into the animal habitat. The sheet comprises at least two fold lines 104, 106 (denoted here as dotted lines) extending along a first dimension defining at least three panels. In this example, the fold lines 104, 106 extend along the length of the sheet 102, defining a left panel 108, back panel 110, and a right panel 112, with each panel 108, 110, 112 having a top 114, middle 116, and bottom 118 section. Other possible arrangements and configurations will be apparent to one skilled in the art given the benefit of this disclosure.

The sheet 102 of disposable and foldable material may be formed of corrugated fiberboard, cardboard, plastic, or other suitable material that is foldable but has sufficient structural rigidity to maintain its form and support a small mammal. In certain embodiments, the sheet is between 15 and 18 inches long and between 8 and 10 inches wide. The panels 108, 110, 112. Other possible arrangements and configurations will be apparent to one skilled in the art given the benefit of this disclosure.

A first instrumentation platform 120 is disposed in a top section 114 of one of the panels 108, 110, 112. In this example, the instrumentation platform 120 is disposed in the top section 114 of the back panel 110. The first instrumentation platform 120 has three sides separated from the panel 110 and a fourth side attached to the panel 110 along a fold line 122 along a second dimension. In this example, the fold line 122 extends along the width of the back panel 110.

Disposing he first instrumentation platform 120 in the top section 114 of one of the panels, such as back panel 110 assures that the height first instrument platform in the assembled and formed tower is sufficient to discourage the small mammal from alighting from the platform. In certain embodiments, the height sufficient to discourage the small mammal from alighting from the platform is at least about 8 inches. In still further embodiments, the height sufficient to discourage the small mammal from alighting from the platform is between about 8 inches and about 12 inches. Other possible arrangements and configurations will be apparent to one skilled in the art given the benefit of this disclosure.

In certain embodiments, the first instrumentation platform 120 further comprises a plurality of holes therethrough. In the example, of FIG. 1, the first instrumentation platform 120 further comprises a plurality of slotted apertures 124 forming a grill shape. Other possible arrangements and configurations will be apparent to one skilled in the art given the benefit of this disclosure.

A second instrumentation platform 126 disposed in a middle section 116 of one of the panels 108, 110, 112. In this example, the second instrumentation platform 126 is disposed in the middle section 116 of the back panel 110. The second instrumentation platform 126 has three sides separated from the panel 110 and a fourth side attached to panel 110 along a fold line 128 along a second dimension of the panel 110. In this example, the fold line 128 extends along the width of the back panel 110. Other possible arrangements and configurations will be apparent to one skilled in the art given the benefit of this disclosure.

In certain embodiments, the sheet 102 of the kit 100 may further include one or more first instrument platform support tabs 130 disposed in the upper section 114 of one or more panels other than the panel having the first instrumentation platform 120. In the example of FIG. 1, the sheet 102 includes first instrument support tabs 130 disposed in the upper section 114 of the left panel 108 and right panel 112. The first instrument platform tabs 130 have three sides separated from their respective panel 108, 112 and a fourth side attached to their respective panel 108, 112 along a fold line 132 along a second dimension. In this example the fold lines 132 are along the width of the panels 108, 112. Other possible arrangements and configurations will be apparent to one skilled in the art given the benefit of this disclosure.

Similarly, in certain embodiments, the sheet 102 of the kit 100 may further include one or more second instrument platform support tabs 134 disposed in the middle section 116 of one or more panels other than the panel having the second instrumentation platform 126. In the example of FIG. 1, the sheet 102 includes second instrument support tabs 134 disposed in the middle section 116 of the left panel 108 and right panel 112. The second instrument platform support tabs 134 have three sides separated from their respective panels 108, 112 and a fourth side attached to their respective panel along a fold line 136 along a second dimension. In this example the fold lines 136 are along the width of the panels 108, 112. Other possible arrangements and configurations will be apparent to one skilled in the art given the benefit of this disclosure.

In still further embodiments, the sheet 102 of the kit 100 further includes at least two tower reinforcing structure tabs 138 disposed in a bottom section 118 of at least two panels 108, 112. In the example of FIG. 1, the sheet 102 includes tower reinforcing structure tabs 138 disposed in the bottom section 118 of the left panel 108 and right panel 112. The tower reinforcing structure tabs 138 have three sides separated from their respective panels 108, 112 and a fourth side attached to the respective panel along a fold line 140 along a second dimension of the panel. In this example the fold lines 140 are along the width of the panels 108, 112. Other possible arrangements and configurations will be apparent to one skilled in the art given the benefit of this disclosure.

In certain embodiments, the sheet 102 of the kit 100 further comprises at least one window aperture 142 in a upper section 114 of a panel 108, 110, 112 that forms least one wall of the first chamber formed in conjunction with the first instrument platform 120 when the habitat is assembled In the example of FIG. 1, window apertures 142 are disposed in the upper section 114 of the left panel 108 and right panel 112. In a similar fashion, one or more window apertures can be formed in the middle section 116 of panels 108, 110, 112, that forms at least one wall of the second chamber formed in conjunction with the second instrument platform 126 when the habitat is assembled.

To assemble habitat of the kit 100, the sheet 102 is folded along the two fold lines 104, 106 along the first dimension, in this case length, of the sheet 102 to form a tower with the at least three panels 108, 110, 112 forming the walls of the tower. The resulting tower has a top section 114, middle section 116, and bottom section 118. In certain embodiments, the formed tower has a parallelogram cross-sectional shape. The first instrumentation platform 120 is folded into the tower along the fold line 122 along the second direction, in this case width, to form, in conjunction with the walls of the tower, a first chamber sized, shaped, and configured to house a mammal and disposed in the top section of the tower. The second instrument platform 126 is folded into the tower along the fold line 128 along the second direction, in this case width, to form, in conjunction with the walls of the tower, a second chamber sized, shaped, and configured to house a mammal and disposed in the middle section of the tower.

In embodiments with first instrument support tabs 130, the first instrument platform support tabs 130 are folded into the tower along fold lines 132 to provide support for the first instrument platform 120. In such embodiments the first instrument support tabs 130 may secured or otherwise fastened to the first instrument platform 120 using adhesive or fasteners. In embodiments with second instrument support tabs 134, the second instrument platform support tabs 134 are also folded into the tower along fold lines 136 to provide support for the second instrument platform 126. In such embodiments the second instrument support tabs 134 may secured or otherwise fastened to the second instrument platform 126 using adhesive or fasteners. In embodiments with tower reinforcing structure tabs 138, the tower reinforcing structure tabs 138 are also folded into the tower along fold lines 140 and secured together using adhesive or fasteners to provide reinforcing structure for the tower.

While the example of FIG. 1 provides dimensions for the various elements, it should be understood that these dimensions can vary or be modified without departing from the teachings of the present disclosure. Other suitable configurations and or dimensions will be apparent to one skilled in the art given the benefit of this disclosure.

Figure 2A:
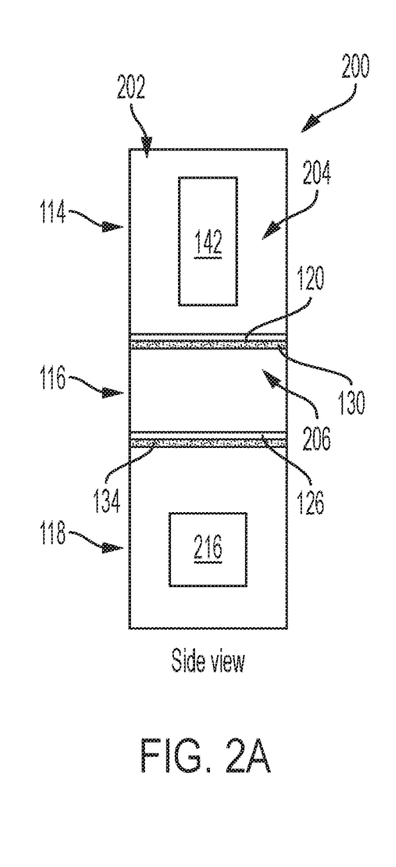
FIGS. 2A-2D depict various views of the disposable and multiconfigurational habitat in a folded and assembled state in accordance with one embodiment of the present invention.
Figure 2B:
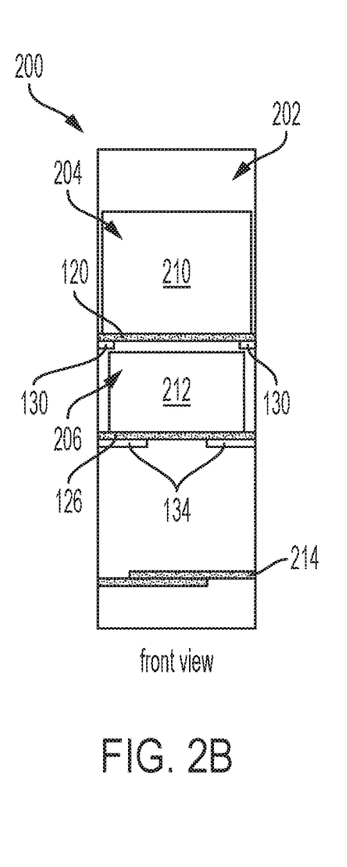
Figure 2C:
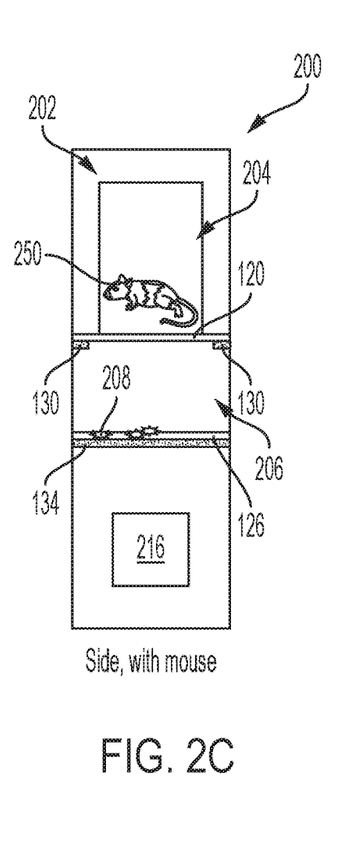
Figure 2D:
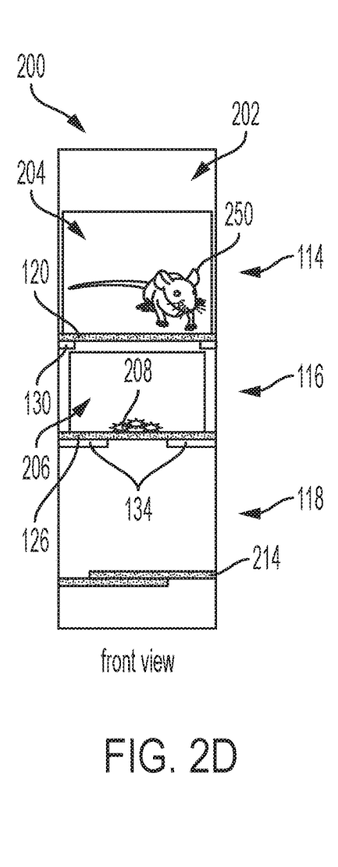

FIGS. 2A-2D depict front and side views of an assembled habitat 200 with and without a small mammal 250 (such as a mouse) situated in the habitat 200. FIG. 2A depicts a side view of the habitat 200. FIG. 2B depicts a front view of the habitat 200. FIG. 2C depicts a side view of the habitat 200 with the small mammal 250 situated in the habitat 200. FIG. 2D depicts a front view of the habitat 200 with the small mammal 250 situated in the habitat 200.

The habitat 200 comprises a disposable and vertically oriented tower 202 having a top section 114, a middle section 116, and a bottom section 118. The tower 202 comprises a first chamber 204 and a second chamber 206.

The first chamber 204 is sized, shaped, and configured to house the small mammal 250 and disposed in the top section 114 of the tower 202. The first instrumentation platform 120 is disposed in the first chamber 204 and is configured to support the small mammal 250. In this example, the first instrument platform 120 has been folded into the tower 202 along fold line 122 to form the floor of the first chamber 204. In certain embodiments, the first instrument platform 120 is supported by first instrument platform support tabs 130 that have been folded into the tower 202 along fold lines 132.

The second chamber 206 is also sized, shaped, and configured to house the small mammal 250 and is disposed underneath the first instrumentation platform 120 in the middle section 116 of the tower 202. The second instrumentation platform 126 is disposed in the second chamber 206 and is configured to support the small mammal 250. In this example, the second instrument platform 126 has been folded into the tower 202 along fold line 128 to form the floor of the second chamber 206. In certain embodiments, the second instrument platform 126 is supported by second instrument platform support tabs 134 that have been folded into the tower 202 along fold lines 136.

In certain embodiments, such as seen in FIG. 2C and FIG. 2D, second instrument platform is configured to catch urine and/or feces 208 from a small mammal 250, that is located in the first chamber 204. As mentioned previously, the first instrument platform 120 may have a plurality of holes or slots 124 formed therein allowing the urine and/or feces 208 to pass through the first instrument platform 120 to be deposited on the second instrument platform 126. In some, such embodiments, the surface of the second instrument platform 126 may further comprise a chemically sensitive surface or coating such that the surface of the second instrument platform 126 changes color to indicate a property of the urine and/or feces 208 that has collected.

As stated previously, the tower 202 of the habitat 200 is formed of a sheet 102 of foldable disposable material. The sheet 102 may be formed corrugated fiberboard, cardboard, plastic, or other suitable material. The tower 202 formed out of the sheet 102 has a parallelogram cross-sectional shape.

In the example, of FIGS. 2A-2D the first chamber 204 and second chamber 206 each comprise three walls formed from the support structure, in this case the panels 108, 110, 112 of the sheet 102 forming the tower 202. When folded and assembled, the left panel 108 and the right panel 112 form opposing walls of the chambers 204, 206 that are linked by the back panel 110. The first chamber 204 and second chamber 206 may also include at least one window aperture 142 in at least one wall of the chambers 204, 206. In this example, as can be seen in FIG. 2A and FIG. 2C windows 142 are located in the upper section 114 of the left section 108 and right section 112 that make up the opposing walls of the first chamber 204. In this embodiment, additional openings 210, 212 are also formed in the chambers 204, 206. Opening 210 is formed in the back panel 110 of first chamber 204 when the first instrument platform 120 is folded into the tower 202. Opening 212 is formed in the back panel 110 of second chamber 206 when the second instrument platform 126 is folded into the tower 202. In certain embodiments, windows, 142, or openings 210, 212 may be covered with a flexible transparent film that may be disposed on the surface of the sheet 102 in the location of the windows 142 or opening 210,212 such that the flexible transparent film is disposed around the perimeter of the first chamber 204 and/or second chamber 206 to keep the subject from exiting the windows 142 or openings 210, 212. A user so erecting said tower can choose from different translucent colors according to ideas regarding colors and visibility that might be surmised to be favorable or adverse to the animal. Moreover, a user could also embellish the interior of the habitat 200 to have one or more reflective walls, should one be curious to study whether or not a lab animal's behavior or physiology is changed by its ability to see and/or process its visible reflection.

When the tower 202 is assembled, as seen in FIGS. 2A-2D, the first instrumentation platform 120 is disposed at a height sufficient to discourage the small mammal from alighting from the platform. In certain embodiments, the height sufficient to discourage the small mammal from alighting from the platform 120 is at least about 8 inches. In still further embodiments, the height sufficient to discourage the small mammal from alighting from the platform 120 is between about 8 inches and about 12 inches.

Like the first chamber 204 and second chamber 206, the bottom section 118 of the tower 202 also comprise three walls formed from the support structure, in this case the panels 108, 110, 112 of the sheet 102 forming the tower 202. When folded and assembled, the left panel 108 and the right panel 112 form opposing walls of the bottom section 118 that are linked by the back panel 110. In certain embodiments, the bottom section 118 of the tower 202 includes a reinforcing support structure 214 formed from structural support tabs 138 that have been folded into the tower 202 and attached together. In this embodiment, folding in the structural support tabs 138 forms an opening 216 in the back panel 110. In some such embodiments, the opening 216 may be covered with a flexible transparent film that may be disposed on the surface of the sheet 102 in the location of the opening 216.

As mentioned previously, the habitat 200 is designed to allow for physiological measurements to be obtained non-invasively. To this effect, the habitat is provided with first and second instrumentation platforms 120, 126. The instrument platforms are configured to be electrically or chemically reactive as necessary to collect or otherwise provide information about a small mammal 250 disposed within the first or second chambers 204, 206 of the tower 202 of the habitat 200.

FIG. 3 and FIGS. 4A-4C depict close up views of a first instrumentation platform 120 in accordance with one embodiment. Here the surface of the first instrument platform 120 is configured to be electrically conductive. There are different means by way the surface of the first instrument platform can become electrically conductive. One way is to construct the first instrument platform 120 of electrically conductive material. Another way is to moisten the top surface of the first instrument platform 120 to increase its conductivity. Another way is to coat or line the top surface of the first instrument platform 120 with a conductive material 300. Silver chloride foil, for example, is routinely printed upon adhesive sheets, which can be readily cut into numerous shapes and sizes, which can be adhered to surfaces such as the first instrument platform 120. It is proposed here, for example, to enable a person to apply a sticker of silver chloride foil 300 configured to match nearly the size and slotted apertures 124 of said first instrument platform 120, so that the top surface of first instrument platform 120 becomes sensitized for detecting the electrocardiographic ECG measurements of the subject standing on the first instrument platform 120.

As can be seen here, and discussed previously, the first instrumentation platform 120 includes a plurality of through holes therethrough that allow urine and/or feces 208 to pass through the first instrument platform 120. This is advantageous for if urine and/or feces were to collect on the surface of the first instrument platform 120, it could interfere with measurements being obtained by the electrically conductive material 300. In the embodiment of FIG. 3 and FIGS. 4A-4C, the holes are slotted apertures 124.

Figure 3:
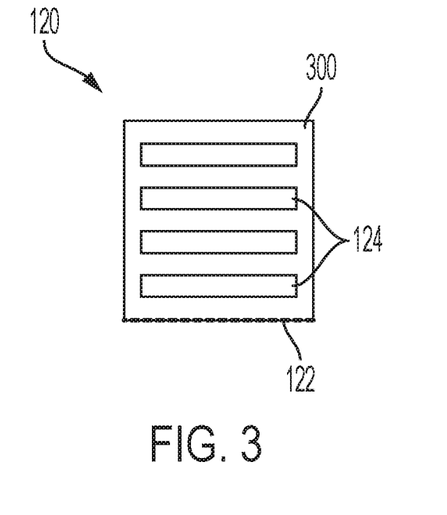
FIG. 3 depicts a view of an instrument platform of the disposable and multiconfigurational habitat in accordance with one embodiment of the present invention.

While the example of FIG. 3 provides dimensions for the various elements, it should be understood that these dimensions can vary or be modified without departing from the teachings of the present disclosure. Other suitable configurations and or dimensions will be apparent to one skilled in the art given the benefit of this disclosure.

Figure 4A:
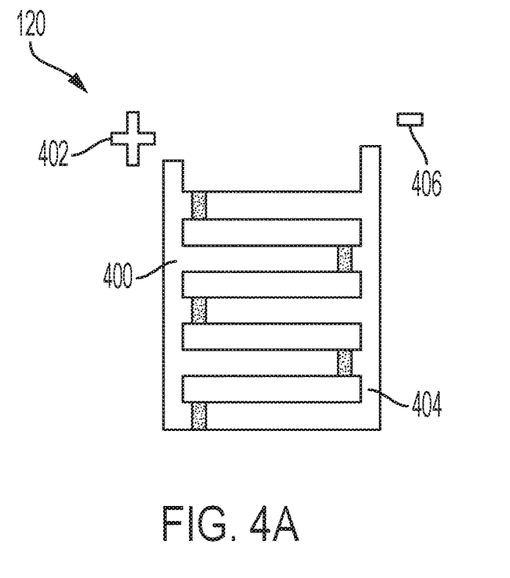
FIGS. 4A-4D depicts a sensor configuration for the instrument platform of the disposable and multiconfigurational habitat and how a small mammal interacts with it in accordance with one embodiment of the present invention.
Figure 4B:
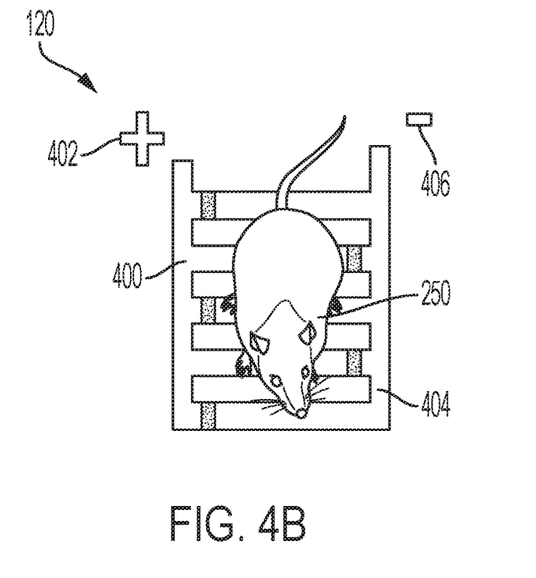
Figure 4C:
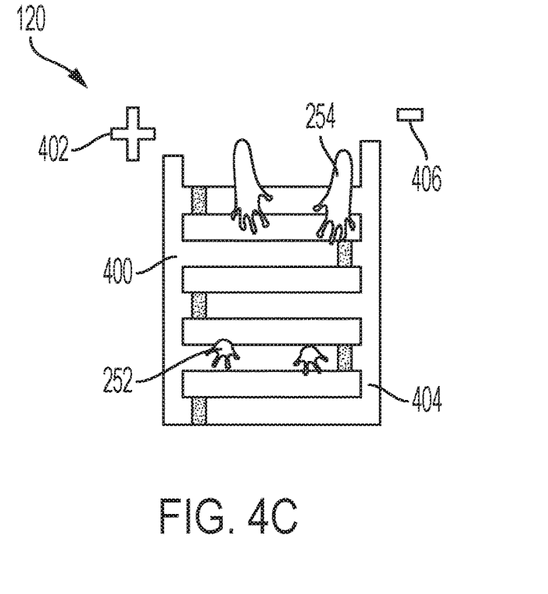

FIG. 4A-4C depicts the floor of the first instrument platform 120 sensitized with application of the conductive foil 300 applied to the floor. FIG. 4A shows the configuration of the conductive material 300 on the floor of the first instrument platform 120. FIG. 4B depicts a small mammal 250 disposed on the first instrument platform 120. FIG. 4C depicts a close-up of the placement of the feet of the small mammal 250 conductive material 300 of the first instrument platform 120.

Figure 4D:
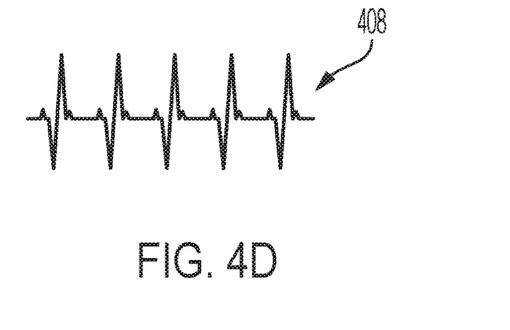

In FIG. 4A-4C the electrically conductive material 300 is arranged so that certain portions 400 of the floor are connected to one pole 402 of an ECG amplifier, and certain portions of the floor 404 are connected to another opposite pole 406 of the ECG amplifier. So arranged, the underside of one foot 252 of a subject such as a small mammal 250 will be in contact with one pole 402, and another foot 254 of the small mammal 250 will be in contact with the other pole 406, as seen in FIG. 4B and FIG. 4C. This allows for an ECG 408 to be recorded as depicted in FIG. 4D.

In the Example of FIG. 3 and FIGS. 4A-4D, the first instrument platform 120 is configured to collect ECG measurements and second instrument panel 126 is configured to catch or otherwise collect urine and/or feces 208 that pass through the slotted apertures 124 of the first instrument platform 120. In such embodiments, the surface of the second instrument platform 126 may further comprise a chemically sensitive surface or coating such that the surface of the second instrument platform 126 changes color to indicate ° a property of the urine and/or feces 208 that has collected.

In another embodiment, a surface of the second instrument platform 126 may be coated with thermochromic paint, such that excrement from the subject in the first instrument platform 120 above falls onto the surface so painted. The paint, in one formulation changes color from approximately black to some degree of red, depending on the temperature, with the transition occurring at approximately 99° F. By positioning said painted surface below the subject, in the path of urine and excrement, the body temperature of the subject can be approximated by noting the change of color of the surface so disposed. The use of high speed video imaging methods and color thresholding software analysis could aid in discriminating small color changes not detectable by eye but nonetheless reporting back the presence, for example, of a relatively high vs. normal body temperature of the subject.

Figure 5A:
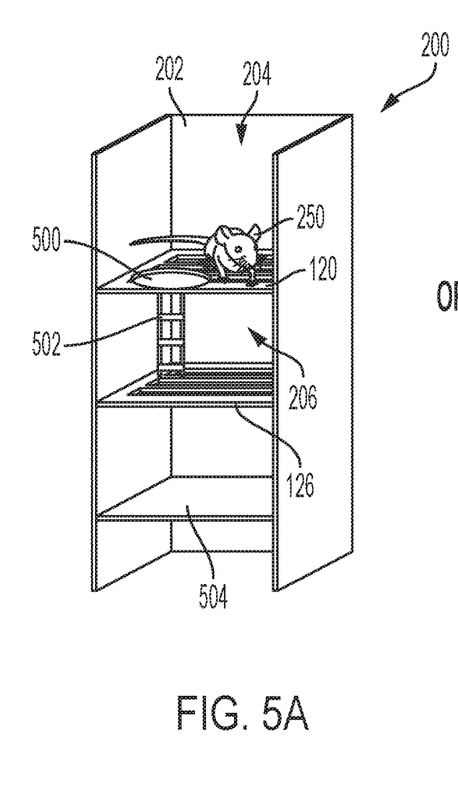
FIGS. 5A-5C depicts various configurations of the folded and assembled disposable and multiconfigurational habitat in accordance with one embodiment of the present invention.
Figure 5B:
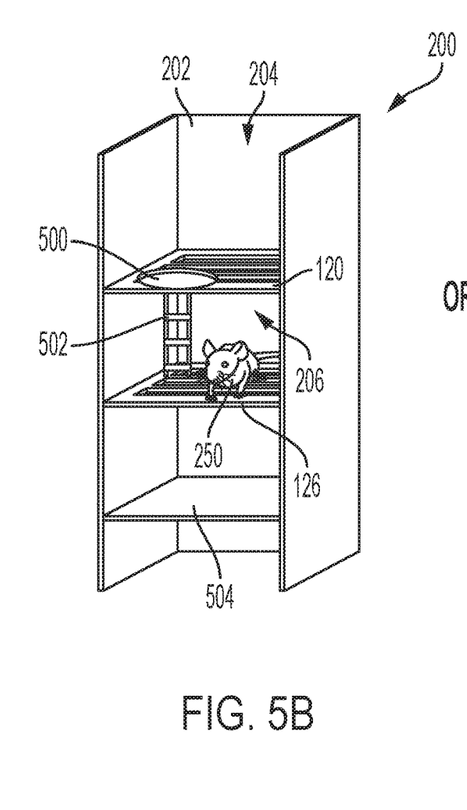
Figure 5C:
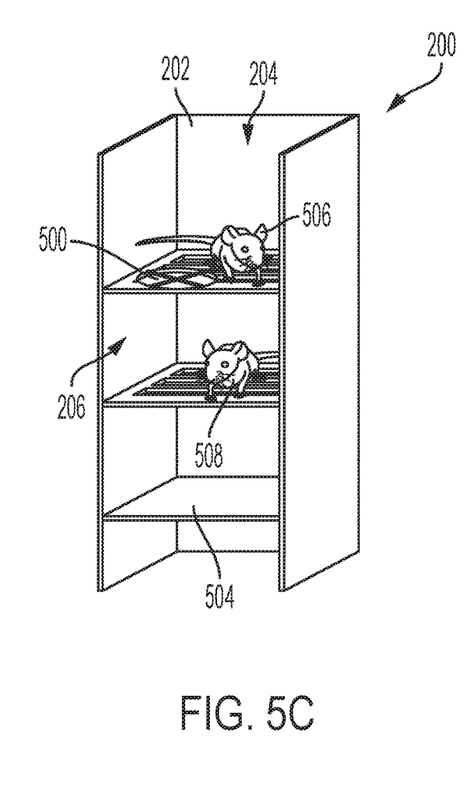

In other embodiments, the second instrument platform 126 can be configured in a similar manner as the first instrument platform 120 as shown and discussed in FIG. 3 and FIGS. 4A-4D. In one such, as seen in FIGS. 5A-5C, there are two different surfaces, the first instrument platform 120 and the second instrument platform 126, upon which an animal, such as a small mammal 250, can stand. In the example of FIG. 5A and FIG. 5B there is a means of egress, such as a pass-through opening 500, in the first instrument platform 120 so that the small mammal 250 can freely pass between these two platform 120, 126. For example, configuring the horizontal surfaces to be vertically separated by, for example, by ~1.5", and incorporating an opening of ~1"×1", creates a 2-floor enclosure with ample space for exploring both surfaces via the opening. In certain embodiments, a ladder 502 or other means of traversing between the first instrument platform 120 and second instrument platform 126 may be provided. In this embodiment, a third instrument platform 504 for collecting urine and/or feces is below the lower of the two floors. A healthy normal small mammal 250 will freely and readily explore both platforms 120, 126, passing easily from one floor to the other floor.

In certain embodiments, the means of egress 500 is selectively operable by the individual erecting the tower 202, to either enable or disenable the subject from migrating between the two surfaces. Alternately, two different animals can be disposed within the tower 202 simultaneously without chance of comingling as seen in FIG. 5C. Here with the means of egress 500 disabled, a first subject 506 explores a first chamber 204, and a second subject 508 explores the second chamber 206, possibly enjoying the proximity of each other, possibly frustrated that they are not enables to co-mingle. It is possible, however, in this configuration, to monitor the vital signs of multiple subjects at the same time or nearly the same time using the sensor configurations on the first instrument platform 120 and second instrument platform 126.

Figure 6:
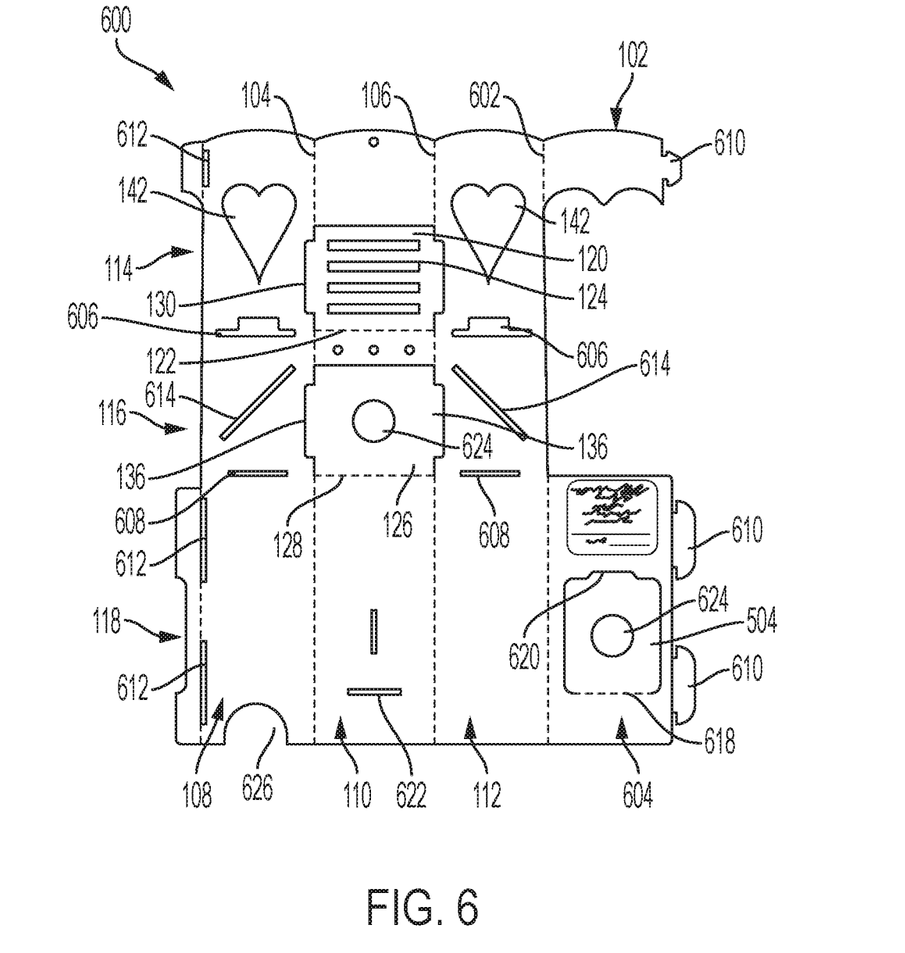
FIG. 6 depicts another kit for the disposable and multiconfigurational habitat in an un-folded and unassembled state in accordance with another embodiment of the present invention.
Figure 7:
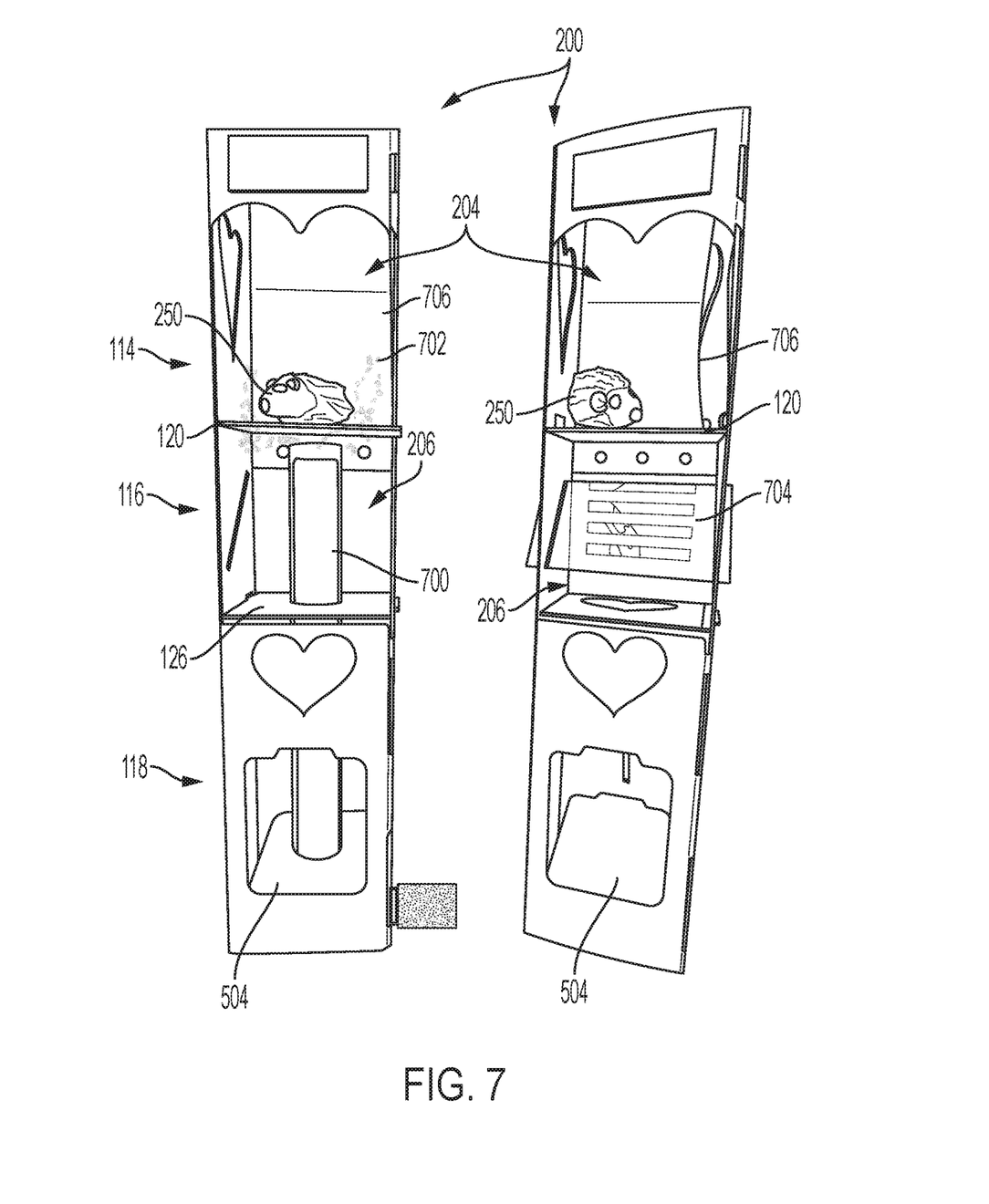
FIG. 7 depicts various configurations of the folded and assembled disposable and multiconfigurational habitat in accordance with another embodiment of the present invention.

FIG. 6 and FIG. 7 depict alternate embodiments of a kit 600 and tower 200 configurations having additional features including olfactory stimulation and observation mirrors.

FIG. 6 depicts an example of kit 600 for a disposable and multiconfigurational animal habitat for obtaining physiological measurements of a small mammal. Like the kit 100 of FIG. 1, this kit 600 comprises a sheet 102 of disposable and foldable material that can be folded or otherwise assembled into the animal habitat. Here, a third fold line 602 is provided in addition to fold lines 104, 106. The third fold line 602 extends along a first dimension defining at a fourth panel. In this example, the fold lines 104, 106 extend along the length of the sheet 102, defining a left panel 108, back panel 110, a right panel 112, and front panel 604 with each panel 108, 110, 112, 604 having a top 114, middle 116, and bottom 118 section. Other possible arrangements and configurations will be apparent to one skilled in the art given the benefit of this disclosure.

A first instrumentation platform 120 is disposed in a top section 114 of one of the panels 108, 110, 112. In this example, the instrumentation platform 120 is disposed in the top section 114 of the back panel 110. The first instrumentation platform 120 has three sides separated from the panel 110 and a fourth side attached to the panel 110 along a fold line 122 along a second dimension. In this example, the fold line 122 extends along the width of the back panel 110.

A second instrumentation platform 126 disposed in a middle section 116 of one of the panels 108, 110, 112. In this example, the second instrumentation platform 126 is disposed in the middle section 116 of the back panel 110. The second instrumentation platform 126 has three sides separated from the panel 110 and a fourth side attached to panel 110 along a fold line 128 along a second dimension of the panel 110. In this example, the fold line 128 extends along the width of the back panel 110. Other possible arrangements and configurations will be apparent to one skilled in the art given the benefit of this disclosure.

In certain embodiments, the sheet 102 of the kit 600 may further include one or more first instrument platform support tabs 130 formed as part of the first instrumentation platform 120. In the example of FIG. 6, the instrument support tabs 130 are configured to be inserted into first instrument support tab slots 606 disposed in the upper section 114 of the left panel 108 and right panel 112. Other possible arrangements and configurations will be apparent to one skilled in the art given the benefit of this disclosure.

Similarly, in certain embodiments, the sheet 102 of the kit 600 may further include one or more second instrument platform support tabs 134 formed as part of the first instrumentation platform 120. In the example of FIG. 6, the instrument support tabs 130 are configured to be inserted into first instrument support tab slots 606 disposed in the upper section 114 of the left panel 108 and right panel 112. Other possible arrangements and configurations will be apparent to one skilled in the art given the benefit of this disclosure.

In this embodiment, the sheet 102 of the kit 600 further includes at least one tower securing tab 610 and securing tab slot 612 disposed in a bottom section 118 of at least two panels 108, 604. In the example of FIG. 6, the sheet 102 includes three tower securing tabs 610. Two tabs 610 are disposed in the bottom section 118 of the front panel 604 and two corresponding securing tab sots 612 disposed in the left panel 112. The third tab is disposed in the upper section 114 of the front panel 604 with a corresponding securing tab slots 612 disposed in the left panel 112. The tower securing tabs 610 are configured to be inserted into and engage with the securing tab slots 612 when the kit 600 is assembled. Other possible arrangements and configurations will be apparent to one skilled in the art given the benefit of this disclosure.

In certain embodiments, the sheet 102 of the kit 600 further comprises at least one window aperture 142 in a upper section 114 of a panel 108, 110, 112 that forms least one wall of the first chamber formed in conjunction with the first instrument platform 120 when the habitat is assembled In the example of FIG. 6, window apertures 142 are disposed in the upper section 114 of the left panel 108 and right panel 112. In a similar fashion, one or more window apertures can be formed in the middle section 116 of panels 108, 110, 112, that forms at least one wall of the second chamber formed in conjunction with the second instrument platform 126 when the habitat is assembled. In this example, the front panel 604 has a cutaway in the upper section 114 and middle section 116 that provides access to the first chamber 204 and second chamber 206 of the assembled tower 202.

In certain embodiments, the sheet 102 of the kit 600 further comprises angled slots 614 in at least two of the panels 108, 110, 112, 604 that make up two opposing walls of the assembled tower 202. In this embodiment, the slots 614 are in the middle section 116 of the left panel 108 and right panel 112. The slots 614 are sized, shaped, and configured to receive a mirror in such a way that when the mirror is placed through the angled slots 614 the mirror is mounted at an angle enabling a view to an underside of the first instrumentation platform 120 by an observer located in front of the tower 202.

In this embodiment, the sheet 102 of the kit 600 also includes at a third instrument platform 508 disposed in a bottom section 118 of at least one of the panels 108, 110, 112, 604. In the example of FIG. 6, the sheet 102 includes a third instrument platform 508 disposed in the bottom section 118 of the front panel 604. The third instrument platform 508 have three sides separated from the front panels 604 and a fourth side attached to the front panel 604 along a fold line 618 along a second dimension of the panel 604. In this example, the fold line 616 extends along the width of the front panel 604. Other possible arrangements and configurations will be apparent to one skilled in the art given the benefit of this disclosure.

In this embodiment, the sheet 102 of the kit 600 further includes one or more third instrument platform support tabs 620 formed as part of the third instrument platform 504. In the example of FIG. 6, the third instrument platform support tab 620 is configured to be inserted into a third instrument support tab slots 622 disposed in the bottom section 118 of the center panel 110. Other possible arrangements and configurations will be apparent to one skilled in the art given the benefit of this disclosure.

In certain embodiments, the second instrument platform 126 and third instrument platform 504 are provided with pass-through openings 624 sized and dimensioned to receive and hold a supply tube that passes from the bottom section 118 of the habitat 200 through the third instrument platform 504 and second instrument platform 126 to supply odors, gases, and/or vapors to the first chamber 204 of a formed tower 202. In some such embodiments, a portal 626 is further provided in the bottom section 118 of the sheet 102. In this embodiment, the portal 626 is disposed in the bottom section 118 of the left panel 108 of the sheet 102. The portal 626 is sized and configured to receive an apparatus for generating or otherwise providing odors, gasses, and/or vapors.

To assemble habitat 200 of the kit 600, the sheet 102 is folded along the three fold lines 104, 106, 602 along the first dimension, in this case length, of the sheet 102 to form a tower with the four panels 108, 110, 112, 604 forming the walls of the tower. The resulting tower has a top section 114, middle section 116, and bottom section 118. In certain embodiments, the formed tower has a parallelogram cross-sectional shape. The first instrumentation platform 120 is folded into the tower along the fold line 122 along the second direction, in this case width, and first instrument support tabs 130 are inserted into first instrument support tab slots 606 to form, in conjunction with the walls of the tower, a first chamber 204 sized, shaped, and configured to house a mammal and disposed in the top section of the tower. The second instrument platform 126 is folded into the tower along the fold line 128 along the second direction, in this case width, and second instrument support tabs 134 are inserted into second instrument support tab slots 608 to form, in conjunction with the walls of the tower, a second chamber 206 sized, shaped, and configured to house a mammal and disposed in the middle section of the tower. The third instrument platform 504 is folded into the tower along fold line 618 along the second direction, in this case width, and third instrument support tab 620 is inserted into third instrument support tab slot 622 to form, in conjunction with the walls of the tower, the base of the tower 202. The tower securing tabs 610 of the front panel 604 are inserted into and engaged with the corresponding securing tab sots 612 disposed in the left panel 112 to secure the front panel 604 to the left panel 108 forming the tower 202.

Two configurations of the assembled tower 202 can be seen in FIG. 7. In the first configuration on the left side of the image, a supply tube 700 has been inserted into pass through openings 624 in the second instrument platform 126 and the third instrument platform 504. The supply tube 700 is sized, shaped, and configured to supply odors, gases, and/or vapors 702 to the first chamber 204. In this example the supply tube 700 extends from the bottom section 118 of the tower 202, through the second chamber 206 disposed in the middle section 116 to the first chamber 204 disposed in the top section 114 of the tower 202. The odors, gases, and/or vapors 702 can be provided to the supply tube 700 via the portal 626 disposed in the bottom section 118 of the left panel 108 of the sheet 102. The portal 626 is sized and configured to receive an apparatus for generating or otherwise providing odors, gasses, and/or vapors 702. In the second configuration on the right side of the image, a mirror 704 has been inserted into the angled slots 614. The mirror 704 is mounted at an angle enabling a view to an underside of the first instrumentation platform 120 by an observer located in front of the tower. As can be seen, an underside of the small mammal through the slotted aperture 124 openings in the first instrument platform 120 when the small mammal is disposed on the first instrumentation platform 120. In other embodiments, the first instrument platform can comprise a transparent material providing an unobstructed view. In both configurations, the first chamber 204 has a flexible transparent film 706 disposed around a perimeter inside the first chamber 204 to contain both the small mammal 250 and odors, gasses, and/or vapors 702. Other possible arrangements and configurations will be apparent to one skilled in the art given the benefit of this disclosure.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A disposable and multiconfigurational animal habitat for obtaining physiological measurements of a small mammal, the habitat comprising:
   a disposable and vertically oriented tower having a top section, a middle section, and a bottom section, the tower comprising:
   a first chamber sized, shaped, and configured to house the small mammal and disposed in the top section of the tower;
   a first instrumentation platform disposed in the first chamber and configured to support the small mammal;
   a second chamber sized, shaped, and configured to house the small mammal and disposed underneath the first instrumentation platform; and
   a second instrumentation platform disposed in the second chamber and configured to support the small mammal;
   wherein the disposable and vertically oriented tower is formed from a single sheet of foldable disposable material erected into the tower.

2. The habitat of claim 1, wherein the habitat is formed of a sheet of corrugated fiberboard.

3. The habitat of claim 1, wherein the habitat structure allows the physiological measurements to be obtained non-invasively.

4. The habitat of claim 1, further comprising a plurality of through holes through the first instrumentation platform.

5. The habitat of claim 1, further comprising a plurality of slotted apertures forming a grill shape in the first instrumentation platform.

6. The habitat of claim 1, further comprising a pass-through opening in the first instrumentation platform that is sized and shaped to enable the small mammal to pass through between the first chamber and the second chamber.

7. The habitat of claim 6, further comprising a ladder disposed on the second instrumentation platform and through the pass-through opening.

8. The habitat of claim 1, wherein the tower has a parallelogram cross-sectional shape.

9. The habitat of claim 1, wherein the first chamber comprises three walls.

10. The habitat of claim 1, wherein the first chamber comprises at least two support structures defining at least a portion of chamber walls.

11. The habitat of claim 1, wherein the second chamber comprises two opposing walls.

12. The habitat of claim 11, further comprising an angled slot in each of the two opposing walls and sized, shaped, and configured to receive a mirror in such a way that when the mirror is placed through the angled slots the mirror is mounted at an angle enabling a view to an underside of the first instrumentation platform by an observer located in front of the tower.

13. The habitat of claim 12, further comprising openings in the first instrument platform wherein the observer is enabled to view an underside of the small mammal through the openings in the first instrumentation platform when the small mammal is disposed on the first instrumentation platform.

14. The habitat of claim 1, further comprising at least one window aperture in at least one wall of the first chamber.

15. The habitat of claim 1, further comprising at least one window aperture in at least one wall of the second chamber.

16. The habitat of claim 1, further comprising a flexible transparent film disposed around a perimeter inside the first chamber.

17. The habitat of claim 1, further comprising electrically conductive material disposed on a top surface of the first instrumentation platform.

18. The habitat of claim 17, wherein the electrically conductive material is configured to obtain electrocardiographic signal measurements when the small mammal is disposed thereon.

19. The habitat of claim 1, wherein the first instrumentation platform is disposed at a height sufficient to discourage the small mammal from alighting from the platform.

20. The habitat of claim 19, wherein the height sufficient to discourage the small mammal from alighting from the platform is at least about 8 inches.

21. The habitat of claim 19, wherein the height sufficient to discourage the small mammal from alighting from the platform is between about 8 inches and about 12 inches.

22. The habitat of claim 1, further comprising a supply tube sized, shaped, and configured to supply odors, gases, and/or vapors to the first chamber.

23. The habitat of claim 22, wherein the supply tube is configured to extend from the bottom section of the tower, through the second chamber disposed in the middle section to the first chamber disposed in the top section of the tower.

24. The habitat of claim 1, further comprising thermochromic paint disposed on one or more surfaces of the habitat.

25. The habitat of claim 1, wherein the bottom section of the tower comprises at least three walls.

26. The habitat of claim 1, further comprising a third instrument platform disposed in the bottom section of the tower.

27. A kit for a disposable and multiconfigurational animal habitat for obtaining physiological measurements of a small mammal, the kit comprising:
a sheet of disposable and foldable material, the sheet comprising:
at least two fold lines extending along a first length dimension of the sheet defining at least three panels, namely, a left panel a back panel and a right panel, with each panel having a top, middle, and bottom section;
a first instrumentation platform disposed in a top section of one of the panels, the first instrumentation platform having three sides separated from the panel and a fourth side attached to the panel along a fold line along a second width dimension of the panel;
a second instrumentation platform disposed in a middle section of one of the panels, the second instrumentation platform having three sides separated from the panel and a fourth side attached to panel along a fold line along a second width dimension of the panel;
wherein the sheet is folded along the two fold lines along the first length dimension of the sheet to form a tower with the at least three panels forming walls of the tower, the tower having a top section, middle section, and bottom section;
wherein, the first instrumentation platform is folded into the tower along the fold line along a second direction to form, in conjunction with the walls of the tower, a first chamber sized, shaped, and configured to house a mammal and disposed in the top section of the tower; and
wherein, the second instrument platform is folded into the tower along the fold line along the second direction to form, in conjunction with the walls of the tower, a second chamber sized, shaped, and configured to house a mammal and disposed in the middle section of the tower.

28. The kit of claim 27, further comprising one or more first instrument platform support tabs disposed in an upper section of one or more panels other than the panel having the first instrumentation platform, the one or more first instrument platform tabs having three sides separated from the panel and a fourth side attached to panel along a fold line along a second width dimension of the panel wherein the first instrument platform support tabs are folded into the tower to provide support for the first instrument platform.

29. The kit of claim 27, further comprising on or more second instrument platform support tabs disposed in the middle section of one or more panels other than the panel having the second instrumentation platform, the one or more second instrument platform support tabs having three sides separated from the panel and a fourth side attached to panel along a fold line along a second width dimension of the panel wherein the second instrument platform support tabs are folded into the tower to provide support for the second instrument platform.

30. The kit of claim 27, further comprising at least two tower reinforcing structure tabs disposed in a bottom section of at least two panels, the at least two tower reinforcing structure tabs having three sides separated from the panel and a fourth side attached to panel along a fold line along a second width dimension of the panel wherein the tower reinforcing structure tabs are folded into the tower and secured together to provide reinforcing structure for the tower.

31. The kit of claim 27, wherein the sheet of disposable and foldable material comprises a third fold line along the first dimension of the sheet, a length, defining a fourth panel wherein when folded along the third fold line, the fourth panel forms a fourth wall of the tower.

32. The kit of claim 31, wherein the fourth panel further comprises cut-outs in an upper and/or middle section to provide access the first chamber and/or second chamber when the sheet is folded to form the tower.

33. The kit of claim 27, wherein the sheet of disposable and foldable material is sheet of corrugated fiberboard.

34. The kit of claim 27, wherein the first instrumentation platform further comprises a plurality of holes therethrough.

35. The kit of claim 27, wherein the first instrumentation platform further comprises a plurality of slotted apertures forming a grill shape.

36. The kit of claim 27, further comprising a pass-through opening in the first instrumentation platform that is sized and shaped to enable the small mammal to pass through between the first chamber and the second chamber.

37. The kit of claim 36, further comprising a ladder disposed on the second instrumentation platform and through the pass-through opening.

38. The kit of claim 27, wherein the formed tower has a parallelogram cross-sectional shape.

39. The kit of claim 27, further comprising an angled slot in each of two panels forming two opposing walls of the tower, the angled slots sized, shaped, and configured to receive a mirror in such a way that when the mirror is placed through the angled slots the mirror is mounted at an angle enabling a view to an underside of the first instrumentation platform by an observer located in front of the tower.

40. The kit of claim 27, further comprising at least one window aperture in an upper section of a panel that forms least one wall of the first chamber.

41. The kit of claim 27, further comprising at least one window aperture in a middle section of a panel that forms at least one wall of the second chamber.

42. The kit of claim 27, further comprising a flexible transparent film disposed on a surface of the sheet along a top section of the at least three panels.

43. The kit of claim 27, further comprising electrically conductive material disposed on a top surface of the first instrumentation platform.

44. The kit of claim 43, wherein the electrically conductive material is configured to obtain electrocardiographic signal measurements when the small mammal is disposed thereon.

45. The kit of claim 27, wherein the first instrumentation platform is disposed in the panel such that a height of the folded first instrument platform in the formed tower sufficient to discourage the small mammal from alighting from the platform.

46. The kit of claim 45, wherein the height sufficient to discourage the small mammal from alighting from the platform is at least about 8 inches.

47. The kit of claim 46, wherein the height sufficient to discourage the small mammal from alighting from the platform is between about 8 inches and about 12 inches.

48. The kit of claim 27, further comprising a supply tube sized, shaped, and configured to supply odors, gases, and/or vapors to the first chamber of a formed tower.

49. The kit of claim 48, wherein the supply tube is configured to extend from the bottom section of the tower, through the second chamber disposed in the middle section to the first chamber disposed in the top section of the tower.

50. The kit of claim 27, further comprising a third instrumentation platform disposed in a bottom section of one of the panels, the third instrumentation platform having three sides separated from the panel and a fourth side attached to panel along a fold line along a second width dimension of the panel.

* * * * *